United States Patent [19]

Motoda

[11] Patent Number: 4,768,256
[45] Date of Patent: Sep. 6, 1988

[54] ULTRASONIC WIPER

[75] Inventor: Kenro Motoda, Tokyo, Japan

[73] Assignee: Motoda Electronics Co., Ltd., Tokyo, Japan

[21] Appl. No.: 928,054

[22] Filed: Nov. 7, 1986

[51] Int. Cl.⁴ .............................................. B60S 1/02
[52] U.S. Cl. ............................... 15/250 R; 296/84 R; 310/323
[58] Field of Search .................. 15/250 R; 296/84 R; 310/313 R, 334, 322, 323, 324; 52/171

[56] References Cited

U.S. PATENT DOCUMENTS 3,171,683  3/1965  Ludwig ....................... 15/250 R X

FOREIGN PATENT DOCUMENTS 1275897  5/1982  Fed. Rep. of Germany .... 15/250 R
  70754  5/1982  Japan ................................ 15/250 R Primary Examiner—Peter Feldman
Attorney, Agent, or Firm—Rogers & Killeen

[57] ABSTRACT

An ultrasonic wiper for conveying a fluid off of a windshield glass of a vehicle characterized by comprising ultrasonic oscillators which excite progressive waves in the glass in a predetermined directional movement.

7 Claims, 1 Drawing Sheet

U.S. Patent   Sep. 6, 1988   4,768,256
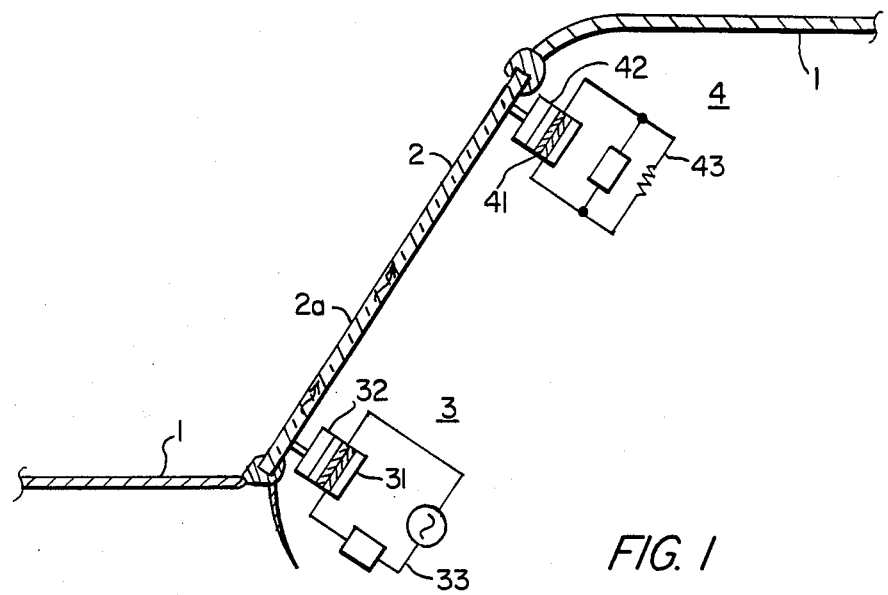
FIG. 1
FIG. 2
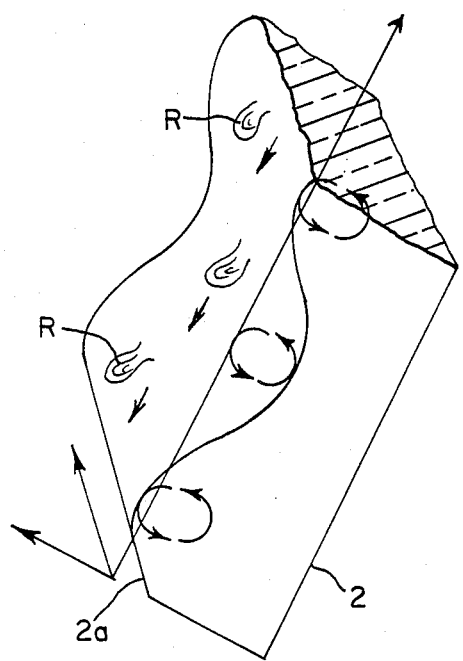
FIG. 3
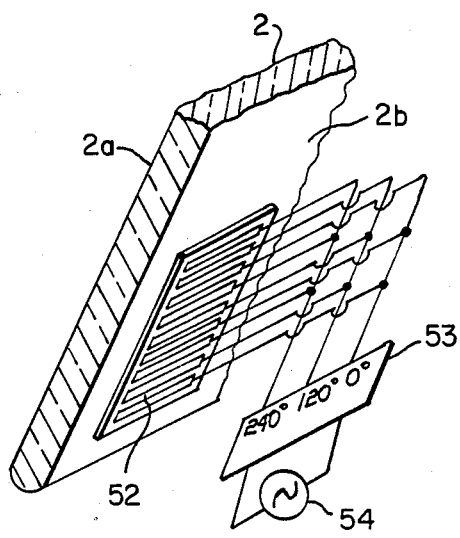

ULTRASONIC WIPER

BACKGROUND OF THE INVENTION

The present invention relates to a wiper used for automobiles which is adapted to wipe rain and snow from a windshield by means of ultrasonic oscillation.

Automobiles and streetcars are generally provided with a so-called wiper apparatus for producing the reciprocating angular movement of a blade by means of a link mechanism.

Since a conventional wiper is, so to speak, of a mechanical type, there are various problems in that such components as the motor, etc., are large in number and the blades employed are often damaged and worn.

In addition, there is the problem that a blade reciprocating on a windshield surface interrupts the vision of the driver and is thus unsuitable for safe driving.

In consideration of the above problems, a blade-less wiper has been proposed (Japanese Patent Publication No. 1760/1962) in which magnetic oscillation is provided on the glass of a windshield in the longitudinal direction so that water droplets adhered thereto are scattered, but this proposal has not been put into practice.

The present invention has been achieved with a view to providing a wiper which has none of the above-described problems as experienced in the conventional mechanical wiper and which adopts a completely different approach from simple addition of oscillation. The invention is characterized by comprising ultrasonic oscillators which excite progressive waves moving from one side to the other of a windshield glass of a vehicle such as an automobile on the outside surface thereof.

DETAILED DESCRIPTION OF THE PREFERRED EMBODIMENT

FIG. 1 is a sectional side view showing the structural concept of an embodiment of a wiper of the present invention;

FIG. 2 is a perspective view showing the carrier principle; and

FIG. 3 is a partially sectional side view of another embodiment.

FIG. 1 is a sectional side view showing the structural concept of a wiper of the present invention. In this drawing, reference number 1 denotes the side section of the body of an automobile; reference number 2, a front windshield glass; and reference numbers 3, 4, ultrasonic oscillators provided on the inner surface (inner side of the vehicle) of the glass, two Langevin longitudinal oscillators 31, 41 being disposed such as to abut against the glass through horn-type transformers 32, 42, respectively.

Each of the oscillators 31, 41 is itself supported by a suitable holder or housing (not shown) at the nodal point of oscillation, the holder or the housing being mounted on the body side of an automobile. In this drawing, reference numbers 33, 43 denote an ultrasonic oscillating circuit and receiving circuit, respectively.

When the oscillator 31 is driven, ultrasonic oscillation excites surface progressive waves on the outer surface of the glass and these progressive waves are received by the oscillator 41. When the outer surface 2a of the glass is now observed, material points on the surface oscillate reversely (counterclockwise) relative to the progressive direction of the waves (upward), and rain and snow R adhered on the surface of the glass 2 are thus subjected to thrust through frictional force between the glass surface 2a and the adhered substances in the direction opposite to the progressive direction of the waves, the rain and snow thereby being caused to fall downwardly on the glass (refer to FIG. 2).

Therefore, if the relationship between the oscillators 3, 4 is reversed, rain and snow on the glass are subjected to upward thrust.

Consequently, the following method of employing the wiper of the present invention shows great benefits.

When a vehicle is running at low speed, the oscillator 3 is driven and the oscillator 4 receives waves, so that downward thrust acts on rain and snow adhered on the glass surface, thereby leading to the synergism which is created by the tendency of the rain and snow to fall by virtue of their own weight and the movement of the surface progressive waves.

When a vehicle is running at high speed, the relationship between the oscillator 3 and the oscillator 4 is reversed so that rain and snow adhered on the glass surface has the tendency to move upwardly on the glass by the effect of wind pressure and the inertial function, and thus the synergism created by this tendency and the surface progressive waves brings about an extremely effective action for removing the adhered rain and snow.

In the present invention, the oscillators for exciting the progressive waves on the surface of the glass may be directly fixed to the surface of the glass without use of a transformer or a transmitter.

FIG. 3 shows another embodiment which, for example, includes nine electrodes 52 provided in parallel on the surface of a piezoelectric body 51 adhered to the inner surface of the glass 2, these electrodes 52 being divided into three circuits and connected to a phase converter 53 in which they are connected to a high frequency electrical power source 54 with the phase of each circuit shifted 120 degrees with respect to the others. By this means, progressive waves are generated in the direction of the movement shown by the arrow in the drawing. The progressive direction of the waves is reversed by reversing the phase shift of the phase converter.

The wiper comprised as described above carries rain droplets adhered to the surface of the glass 2 or becoming adhered thereto by means of the function of the progressive waves through the frictional force between the glass surface and the adhered substances, or thereby prevents them from adhering to the surface.

The wiper of the present invention can of course be applied to the front windshield glass of an automobile, as well as to the side or rear thereof or to the window glass of buildings.

As described above, since the wiper of the present invention is so constructed that progressive waves are excited on the surface of the front windshield glass of an automobile by ultrasonic oscillation, rain droplets adhered to the glass or becoming adhered thereto are carried by means of the function of the progressive waves or prevented from adhering thereto, and thus it becomes unnecessary to employ a blade-type wiper which reciprocates when driven by a motor.

I claim:

1. Apparatus for conveying a fluid from glass having a fluid contacting outer surface and an inner surface and having first and second distal edges, comprising:

plural first oscillator means mounted on said inner surface adjacent said first edge;

plural first ultrasonic oscillating circuits for driving said first oscillator means, whereby multiple first progressive waves moving away from said first edge are formed on said outer surface when said first oscillating circuits are operating;

plural second oscillator means mounted on said inner surface adjacent said second edge;

plural second ultrasonic oscillating circuits for driving said second oscillator means, whereby multiple second progressive waves moving away from said second edge are formed on said outer surface when said second oscillating circuits are operating;

first receiving means adjacent said second edge for receiving said first progressive waves; and second receiving means adjacent said first edge for receiving said second progressive waves;

2. Apparatus as defined in claim 1 wherein said first and second oscillator means further comprise transformer means adjacent said inner surface.

3. Apparatus as defined in claim 2 wherein said transformer means comprise horn-type transformers.

4. An ultrasonic wiper for removing fluid from glass having a fluid-contacting outer surface and an inner surface, comprising:

first oscillator means mounted on said inner surface for forming a progressive wave on said outer surface; and first receiving means mounted on said inner surface for receiving said progressive waves, whereby said progressive waves move toward said first receiving means conveying said fluid toward said first oscillator means.

5. The ultrasonic wiper of claim 4 wherein:

said first oscillator means comprises a second receiving means;

said first receiver means comprises a second oscillator means; and further comprising switching means for reversing the direction of said progressive waves.

6. An ultrasonic wiper for removing fluid from glass having a fluid-contacting outer surface and an inner surface, comprising:

generating means for generating high frequency electrical power;

a piezoelectric body attached to said inner surface;

plural electrodes attached to said piezoelectric body, said electrodes being divided equally among three circuits; and a phase converter for connecting said high frequency electrical power to said electrodes and for shifting the phase of each of said three circuits approximately 120 degrees with respect to each of the other said three circuits, whereby progressive waves are formed on said outer surface moving in a predetermined direction when said generating means is operating.

7. The ultrasonic wiper of claim 6 further comprising switching means for reversing the phase shifting of said phase converter whereby the direction of said progressive waves is opposite to said predetermined direction.

* * * * *